(12) United States Patent
Perron

(10) Patent No.: US 9,249,553 B2
(45) Date of Patent: Feb. 2, 2016

(54) SYSTEM AND METHOD FOR CONTROLLING AND TREATING GAS EMANATIONS INSIDE A WASTEWATER ACCESS SHAFT

(71) Applicant: Francois Perron, Candiac (CA)

(72) Inventor: Francois Perron, Candiac (CA)

( * ) Notice: Subject to any disclaimer, the term of this patent is extended or adjusted under 35 U.S.C. 154(b) by 154 days.

(21) Appl. No.: 14/185,712

(22) Filed: Feb. 20, 2014

(65) Prior Publication Data
US 2014/0165835 A1     Jun. 19, 2014

Related U.S. Application Data

(63) Continuation of application No. PCT/CA2012/050592, filed on Aug. 27, 2012.

(30) Foreign Application Priority Data

Aug. 26, 2011 (CA) .................................. 2751144

(51) Int. Cl.
| | |
|---|---|
| *B01D 46/00* | (2006.01) |
| *E02D 29/14* | (2006.01) |
| *E03F 5/04* | (2006.01) |
| *E03F 5/08* | (2006.01) |

(52) U.S. Cl.
CPC ........ *E02D 29/1463* (2013.01); *B01D 46/0028* (2013.01); *B01D 46/0038* (2013.01); *E03F 5/0405* (2013.01); *E03F 5/08* (2013.01)

(58) Field of Classification Search
CPC ............................... B01D 46/28; B01D 46/38
USPC ........ 95/90, 135, 143, 273, 285; 96/118, 147, 96/222; 55/385.1, 381, 421, 490, 502; 210/163–164
See application file for complete search history.

(56) References Cited

U.S. PATENT DOCUMENTS

| | | |
|---|---|---|
| 154,645 A | 9/1874 | Chase |
| 606,554 A | 6/1898 | Jacobs |
| 2,615,526 A | 10/1952 | Lane |
| 3,377,784 A | 4/1968 | Walker |
| 3,475,885 A | 11/1969 | Kline |
| 3,973,856 A | 8/1976 | Gaglioti |
| 4,026,688 A | 5/1977 | Patterson |
| 4,030,851 A | 6/1977 | Graybeal |
| 4,586,941 A | 5/1986 | Cooley |
| 4,919,564 A | 4/1990 | Neathery et al. |
| 5,511,904 A | 4/1996 | Van Egmond |

(Continued)

FOREIGN PATENT DOCUMENTS

| | | |
|---|---|---|
| BE | 509925 A | 3/1952 |
| CN | 201326217 Y | 10/2009 |

(Continued)

*Primary Examiner* — Jason M Greene
*Assistant Examiner* — Karla Hawkins
(74) *Attorney, Agent, or Firm* — IPAXIO S.E.N.C.

(57) ABSTRACT

The system makes it possible to control and treat gas emanations inside a wastewater access shaft. The system includes a cover with at least one pivoting part, which is normally closed, having a substantially horizontal rotation axis and able to allow solid and/or liquid matter falling onto the main upper surface of the cover to pass toward the bottom of the access shaft. The cover also includes a raised part that has at least one lateral wall and includes a plurality of orifices situated vertically above the main upper surface of the cover. The orifices define an outlet of a gas-emanations circuit formed between the underside and the top of the cover. An air filter is arranged across the circuit. The filter is moistened by a liquid that comes from a reservoir in order to treat the emanations.

20 Claims, 9 Drawing Sheets

(56) References Cited

U.S. PATENT DOCUMENTS

| | | |
|---|---|---|
| 5,846,274 A | 12/1998 | Smelser |
| 5,925,241 A | 7/1999 | Aldridge et al. |
| 6,146,435 A | 11/2000 | Stork |
| 6,254,770 B1 | 7/2001 | Remon |
| 6,379,429 B1 | 4/2002 | Scranton, Jr. |
| 6,379,433 B1 | 4/2002 | Scranton, Jr. |
| 6,848,465 B1 | 2/2005 | Ledbetter |
| 2007/0199948 A1 | 8/2007 | Ericson |
| 2009/0145737 A1* | 6/2009 | Kamen et al. .......... B01D 1/221 202/185.1 |

FOREIGN PATENT DOCUMENTS

| | | | |
|---|---|---|---|
| CN | 101591935 A | | 12/2009 |
| DE | 19608201 A1 | | 5/1997 |
| DE | 19650023 A1 | | 6/1998 |
| EP | 745731 B1 | | 3/2000 |
| EP | 952263 B1 | | 3/2004 |
| EP | 1422354 B1 | | 9/2007 |
| EP | 1548193 B1 | | 1/2009 |
| FR | 2613399 B1 | | 10/1988 |
| FR | 2786480 A1 | | 6/2000 |
| GB | 14929 A | | 0/1905 |
| GB | 2143262 A | | 2/1985 |
| JP | H09327690 A | | 12/1997 |
| JP | 2003094078 A | | 4/2003 |
| WO | 2010138997 A1 | | 12/2010 |
| WO | 2013029172 A1 | | 3/2013 |

\* cited by examiner

SYSTEM AND METHOD FOR CONTROLLING AND TREATING GAS EMANATIONS INSIDE A WASTEWATER ACCESS SHAFT

CROSS REFERENCE TO AN EARLIER APPLICATIONS

The present case is a continuation of PCT application No. PCT/CA2012/050592 filed on 27 Aug. 2012, which claims priority to Canadian patent application No. 2,751,144 filed on 26 Aug. 2011. The entire contents of these two prior applications are incorporated herein by reference in their entirety.

TECHNICAL FIELD

The technical field relates to systems allowing control and treatment of gas emanations, notably foul-smelling, toxic and/or explosive emanations escaping from a wastewater access shaft, particularly an access shaft providing access to a storm drain of the combined sewer storm drain type. It also relates to the manufacture of these systems and to their use in the context of methods seeking to control at least one of the intrinsic characteristics of the emanations.

BACKGROUND

Sewage networks are places where various foul-smelling, toxic and/or explosive gases may circulate. These gases generally originate from the decomposition of organic matter and have a tendency to escape via the access shafts (also known as "manholes") in the form of gas emanations. They may be more abundant in hot weather. These gas emanations may cause people on the surface discomfort or even health problems.

It is generally not possible to seal the access shafts without creating other potential problems. Ventilation is even often essential in order to prevent excessive quantities of gas from accumulating at certain points in the sewage network.

Most modern sewage networks have separate pipes for the foul sewage and the storm water. The storm drain access shafts are closed at the top only by a grating or even a slot of varying widths running along the curbside. These openings are notably able to accommodate rainwater or water from melting snow in order to remove it from the surface and convey it to somewhere where it can be disposed of. The foul sewage access shafts are generally closed by a cover the openings of which are far smaller, notably in order to minimize the amount of gas emanations to the surface.

In spite of this, storm drain access shafts may emit foul-smelling, toxic and/or explosive gases for various reasons, notably in places where the infrastructures use older so-called "combined" sewer storm drain networks. These networks have pipes through which both rainwater and foul sewage circulate. However, because the storm water access shafts of these combined networks need to be used to collect rainwater, their upper opening needs to remain uncovered in all weathers.

Various devices have been proposed in the past to lessen the odors emanating from the drains. For example, U.S. Pat. No. 5,846,274 describes a biofilter which is fitted into an access shaft in order to reduce or eliminate odors therein. U.S. Pat. No. 4,586,941 and EP Patent No. 952263 B1 describe devices of a similar kind Other devices also exist.

Many of the known devices may be complex to install or alternatively may entail significant investment. Others use filters which have a tendency to become blocked after a certain time. Active charcoal filters are particularly sensitive to this. It is also difficult to prevent debris, solid or otherwise, from entering the access shaft. These debris may, for example, be sand, dirt, gravel, etc. Some devices may then become blocked or less effective. They will therefore require more intensive and costly maintenance.

Another potential problem is the presence of stagnating water within the access shafts. This water may encourage the hatching-out of mosquitoes or other undesirable insects. Certain insects may carry diseases, for example the West Nile Virus to name but one. It is thus desirable to restrict access by insects to the stagnant water in the bottom of the access shafts.

It is therefore clear that improvements in the technical field concerned were needed.

SUMMARY

According to one aspect of the proposed concept, there is provided a system for controlling and treating gas emanations within a wastewater access shaft, the access shaft having an internal wall, an upper edge and a bottom delimiting a substantially vertical chamber, which vertical chamber is divided transversely by the system into a lower section and an upper section, the system including: a cover having a main upper surface, the cover including: at least one pivoting part, which is normally closed, having a substantially horizontal rotation axis and allowing solid and/or liquid matter falling onto the main upper surface of the cover to pass toward the lower section of the vertical chamber; a raised part situated on the top of the cover and having at least one lateral wall including a plurality of orifices situated vertically above the main upper surface, the orifices defining an outlet of a gas-emanations circuit, which circuit is formed between the underside and the top of the cover; a device to connect the cover to the internal wall of the access shaft; an air filter arranged across the gas-emanations circuit formed in the cover; and a gas-emanations treatment liquid reservoir, the liquid reservoir being in fluid communication with the air filter in order to moisten air filter with the treatment liquid.

According to another aspect, there is provided a process for manufacturing a system as defined hereinabove, in which the constituent elements of the system are assembled using known methods of assembly.

According to another aspect, there is provided a method for controlling at least one intrinsic characteristic of emanations, such as the foul-smelling, toxic and/or explosive nature of the emanations escaping from an access shaft, the method consisting in installing and activating the system as defined hereinabove.

According to another aspect, there is provided a method for controlling at least one intrinsic characteristic of emanations, such as the foul-smelling, toxic and/or explosive nature of the emanations escaping from an access shaft, the method including: a) installing, within the access shaft, a system that lessens the diffusion of foul-smelling, toxic and/or explosive emanations; and b) filling the reservoir with liquid when necessary.

Further details regarding these aspects as well as other aspects of the proposed concept will become apparent in the light of the following detailed description and of the appended figures.

DETAILED DESCRIPTION

Figure 1:
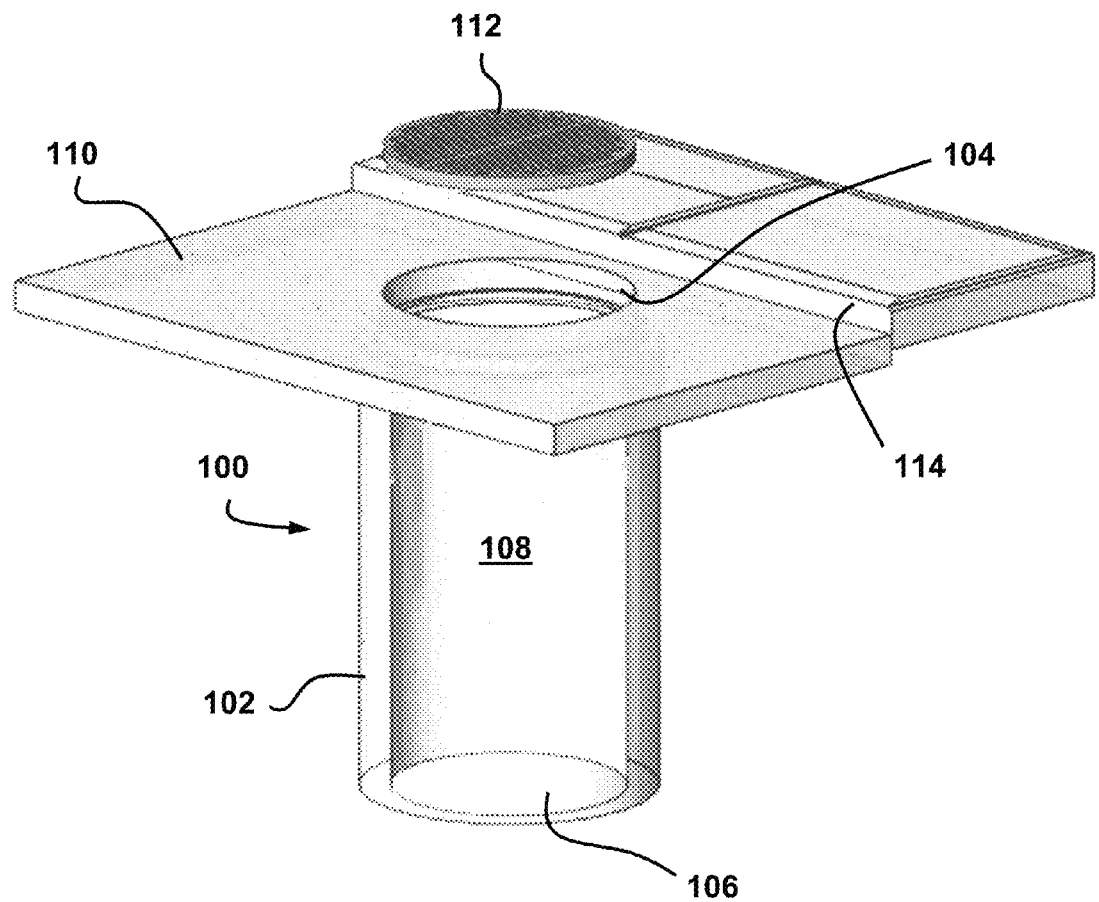
FIG. 1 is an isometric view of an example of a wastewater access shaft.

FIG. 1 is an isometric view of an example of a wastewater access shaft 100, notably a storm drain access shaft such as found in municipalities. These access shafts 100 can be used in other places and the present concept is therefore not limited to municipal use. The access shaft illustrated 100 has an internal wall 102, an upper edge 104 and a bottom 106. These delimit a chamber 108 which is substantially vertical. Such an access shaft 100 is generally situated in a thoroughfare 110 or any other place where rainwater or water from melting snow cannot be removed adequately. The access shaft 100 of the example is closed by a removable grating 112 and is positioned near a curbside 114.

Most access shafts have a cross section of substantially circular shape. There are exceptions. The access shaft 100 of the example is circular and, to make the text less cumbersome, the present description will refer to the fact that the access shaft 100 is circular. The reader must understand that this is merely one example.

Figure 2:
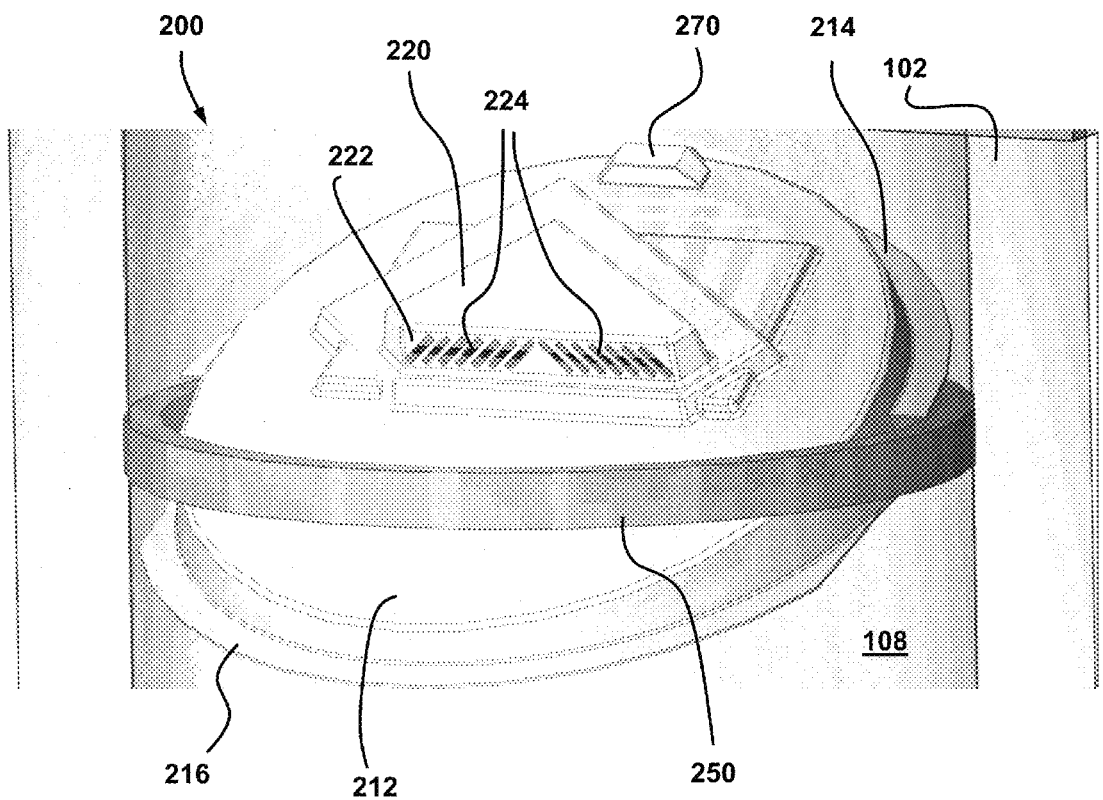
FIG. 2 is an isometric view of an example of a system according to the proposed concept.

FIG. 2 is an isometric view of an example of a system 200 according to the proposed concept for controlling and treating gas emanations inside an access shaft 100. The system 200 allows the vertical chamber 108 to be divided into a lower section and an upper section. The system 200 is installed inside the access shaft 100 but preferably at a depth where it can be accessed manually from the upper edge 104. This depth may for example be of the order of around 60 to 100 cm. A worker will thus be able to access it easily, for example by lying on the ground. Variants are also possible. It is generally desirable to avoid a worker having to descend into the access shaft 100 because the safety procedures and equipment required are not the same.

The system 200 includes a cover 210 having a main upper surface 212. The cover 210 of the example is fully pivoting. It would, however, be possible to have a cover 210 with a fixed part and at least one pivoting part. The cover 210 is normally in a closed position and pivots about a rotation axis 218 (FIG. 5) that is substantially horizontal. The cover 210 is designed to allow solid and/or liquid matter falling onto the main upper surface 212 of the cover 210 to pass toward the lower section of the vertical chamber 108. The solid and/or liquid matter is, for example, water, sand, dirt, gravel, etc. The cover 210 pivots when the combined weight of this matter counterbalances the return force created by the asymmetric design of the cover 210. The pivoting allows this matter to be directed toward the bottom 106 of the access shaft 100. However, under normal conditions, the cover 210 is in a substantially horizontal position and the passage is entirely closed off by the cover 210. The half that pivots downward under the effect of the weight of the matter is the "descending side" and the half that pivots upward is the "ascending side".

Most of the cover 210 has a monolithic construction and is made of plastic. Other configurations and materials are also possible. If necessary, a ballast weight may be used to tune the pivoting. A return device, such as a spring, may also be provided in certain implementations.

As illustrated in FIG. 2, the cover 210 includes a raised part 220 situated on the top. In the example, it is situated on the ascending side. The raised part 220 has at least one lateral wall 222 provided with a plurality of orifices 224. The bottom of these orifices 224 is situated vertically above the main upper surface 212 so as to minimize the risk of rainwater and solid debris entering them and reaching an air filter situated inside. The air filter will therefore be able to remain clean and will be far more effective in the long term. In the example, the raised part 220 is at least predominantly situated on the ascending side of the cover 210 and the main upper surface 212 is predominantly situated on the descending side of the cover 210 with respect to the rotation axis 218. Upon pivoting, the ascending side has a higher weight than the descending side so that the cover 210 is normally kept in the closed position.

FIG. 2 also shows that, in the example, the ascending side of the cover 210 includes a curved upper rim 214 and that the descending side of the cover 210 includes a curved lower rim 216. Other configurations and arrangements are also possible.

The orifices 224 are situated at the outlet of a gas-emanations circuit inside the cover 210. This circuit is formed between the underside and the top of the cover 210 so as to allow the gases to pass. Air can also pass through in the opposite direction when the internal pressure is lower than the pressure outside. When the cover 210 is in the closed position, the gas emanations can pass only via the gas-emanations circuit.

Figure 3:
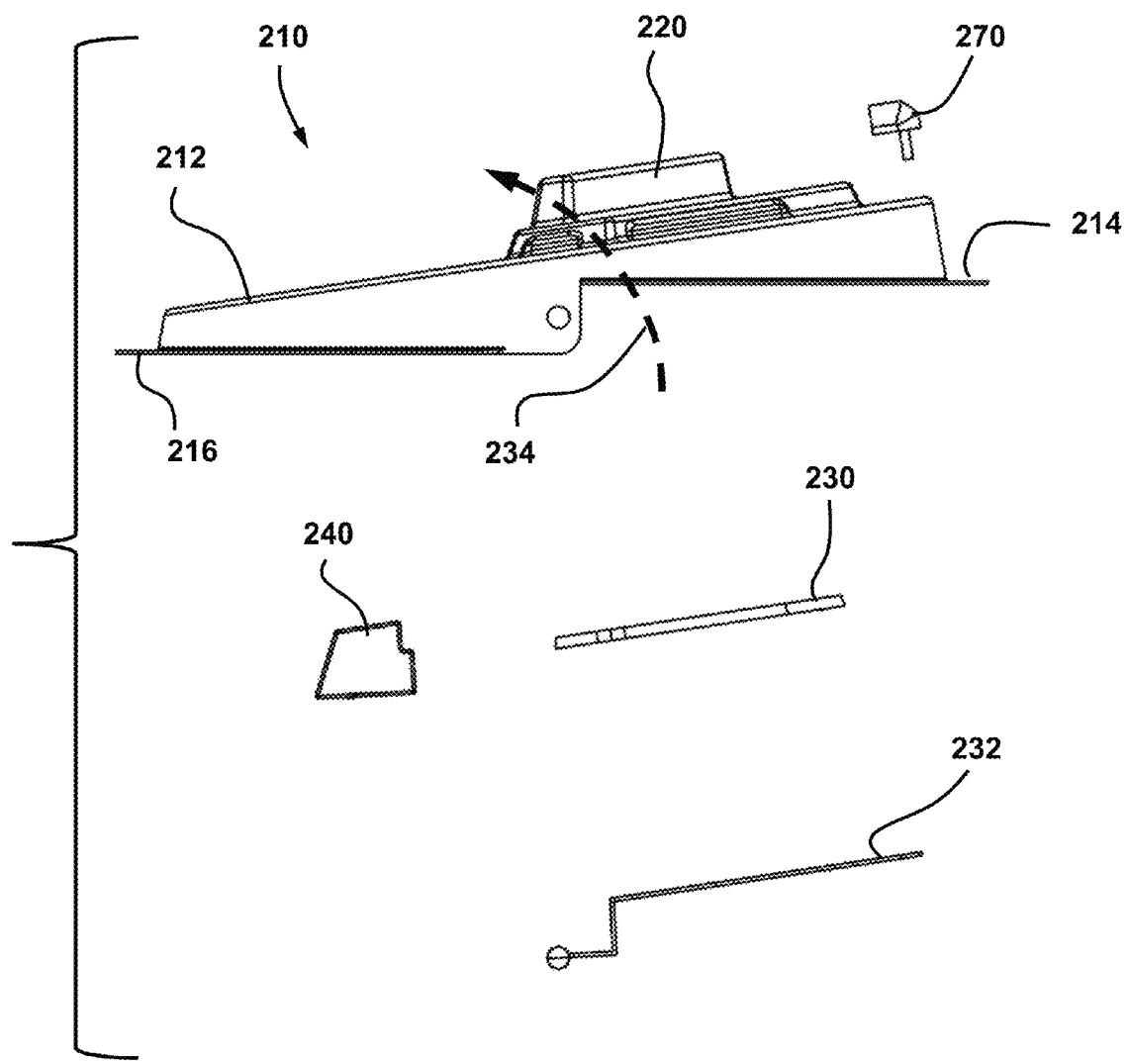
FIG. 3 is an exploded view of certain components of the system illustrated in FIG. 2.
Figure 4:
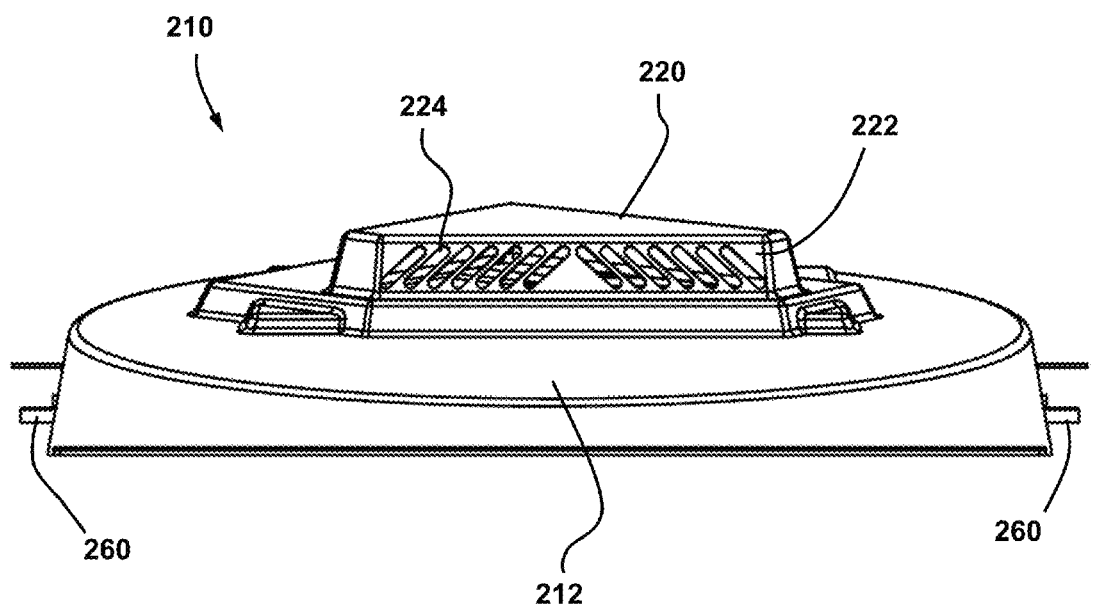
FIG. 4 is a front view of the cover of FIG. 2.

FIG. 3 is an exploded view of certain components of the system 200. Visible there notably is the air filter 230. The air filter 230 is positioned across the gas-emanations circuit formed in the cover 210. The air filter 230 is positioned in such a way that any gas circulating through the circuit has to pass through this filter 230. It is situated under the cover 210 and, in the example, is supported by a support 232 which is connected to the rotation axis 218. It should be noted that the gas-emanations circuit is schematically illustrated in FIG. 3 by the arrow 234.

Figure 5:
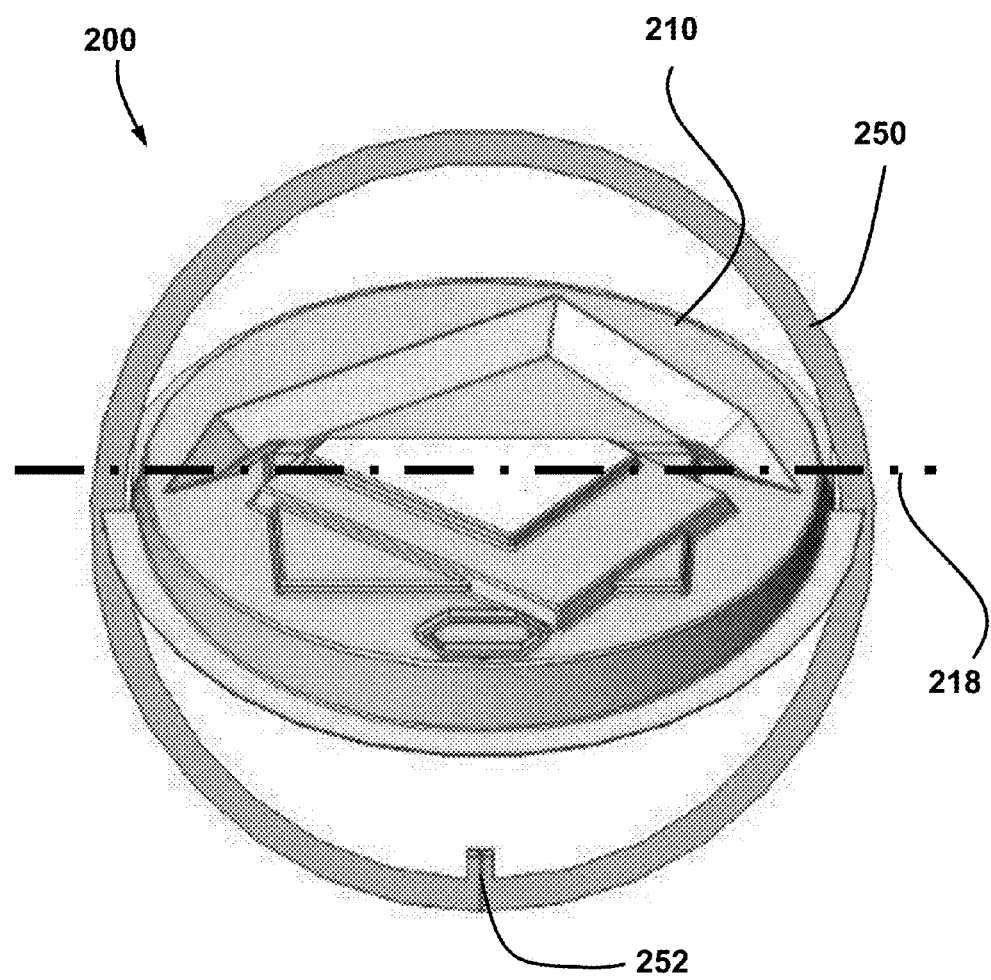
FIG. 5 is a top view of the system of FIG. 2.

FIG. 5 is a top view of the system 200. This figure schematically illustrates the rotation axis 218.

The air filter 230 is kept moist using the contents of a gas-emanations treatment liquid reservoir 240. The liquid reservoir 240 is in fluid communication with the air filter 230 to moisten it with the treatment liquid. In the example illustrated, the liquid reservoir 240 is situated in the cover 210 and the air filter 230 is moistened by capillarity. Other embodiments are possible. For example, it would be possible to use a pump, notably a peristaltic or some other pump, which sends one or more liquid jets at programmed intervals or as needs be. Other types of configuration are also possible. The reservoir 240 can be filled by unscrewing a cap or the like situated on the top of the cover 210. It would also be possible to conceive of a removable reservoir, for example a reservoir suspended near the upper edge 104 of the access shaft 100 and connected to the cover 210 by a flexible tube. Various other configurations are also possible.

The cover 210 needs to be positioned at a certain depth and has therefore to be connected to the internal wall. Certain access shafts may have a shoulder or some other structure available for this purpose. However, if such is not the case, it is then possible to use an adapter 250 configured to press with an interference fit against the internal wall 102 of the access shaft 100 and provide a peripheral seal.

An adapter 250 is used in the example. This adapter 250 has a substantially annular shape and includes an expander device 252 to reduce or increase the outside diameter of the adapter 250. The external peripheral surface of the adapter 250 is designed to offer a continuous and substantially hermetic interface with the internal wall 102. It is arranged horizontally at the desired height, then the expander device 252 (with screws or the like) is operated in order to gradually increase its outside diameter until the required retaining force is reached. The cover 210 can then be connected to the adapter 250 using its connection device.

The adapter 250 may be made of polymer materials, preferably of plastic or of recycled rubber, with an internal metal reinforcement. Other configurations and materials are also possible.

Figure 6:
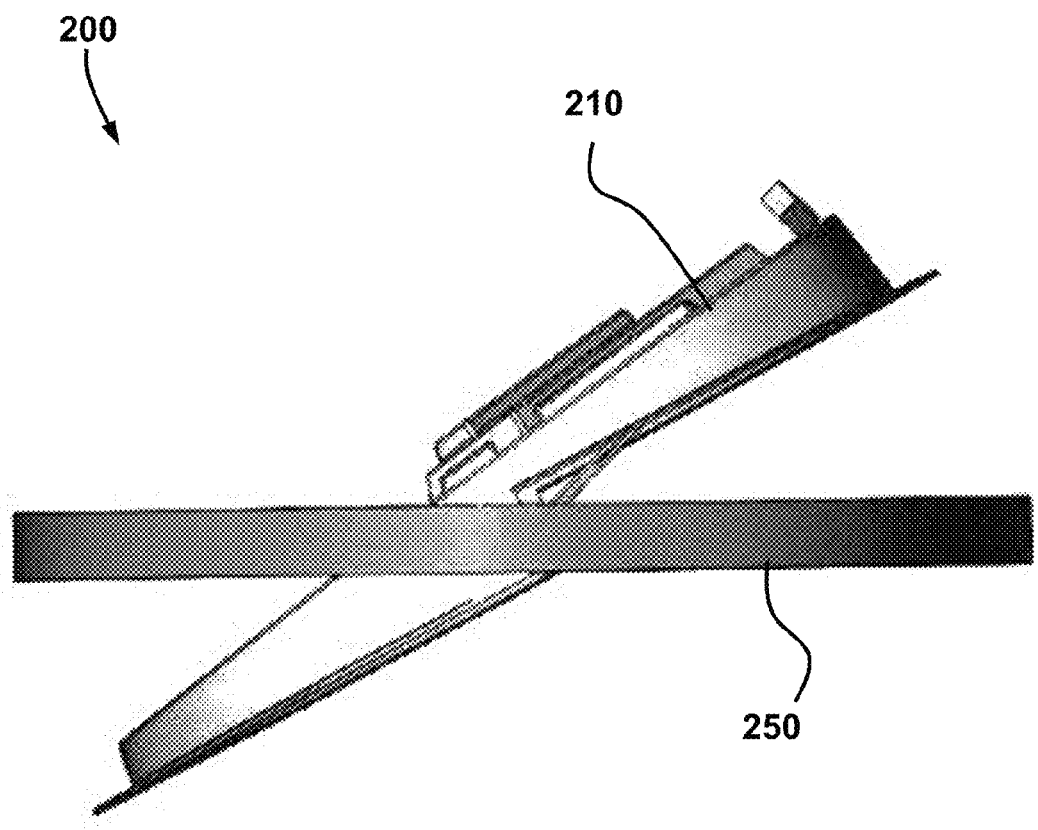
FIG. 6 is a side view of the system of FIG. 2.

FIG. 6 is a side view of the system 200.

The device to connect the cover 210 in the example includes two opposed lugs 260 coinciding with the rotation axis. The lugs 260 each rest on a corresponding housing 262 of the adapter 250. The lugs 260 and the housings 262 have complementing shapes allowing the cover 210 to be removed from the access shaft 100 by manually pivoting the cover to substantially vertical then pulling the cover 210 vertically.

Figure 7:
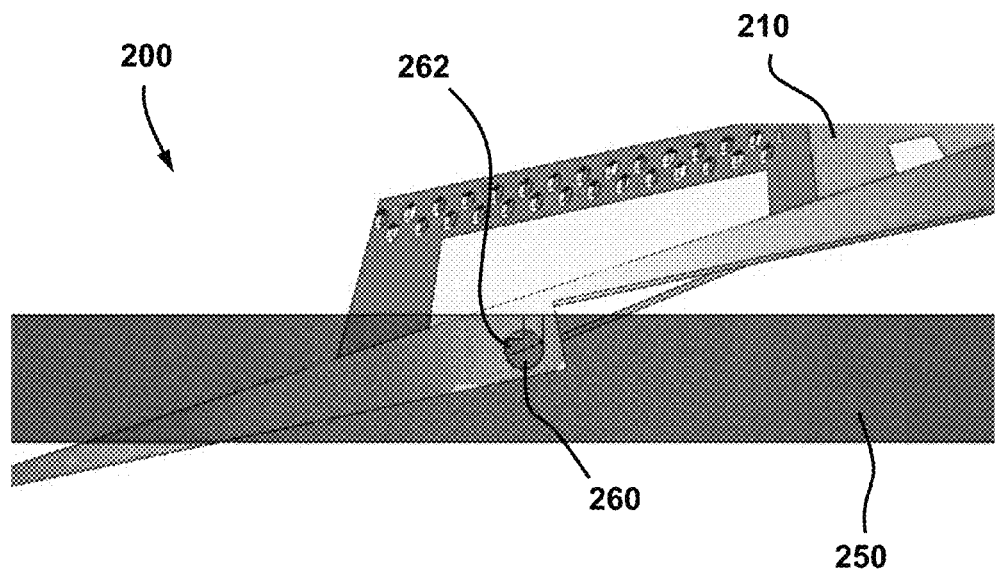
FIG. 7 is an enlarged side view of the system of FIG. 2.
Figure 8:
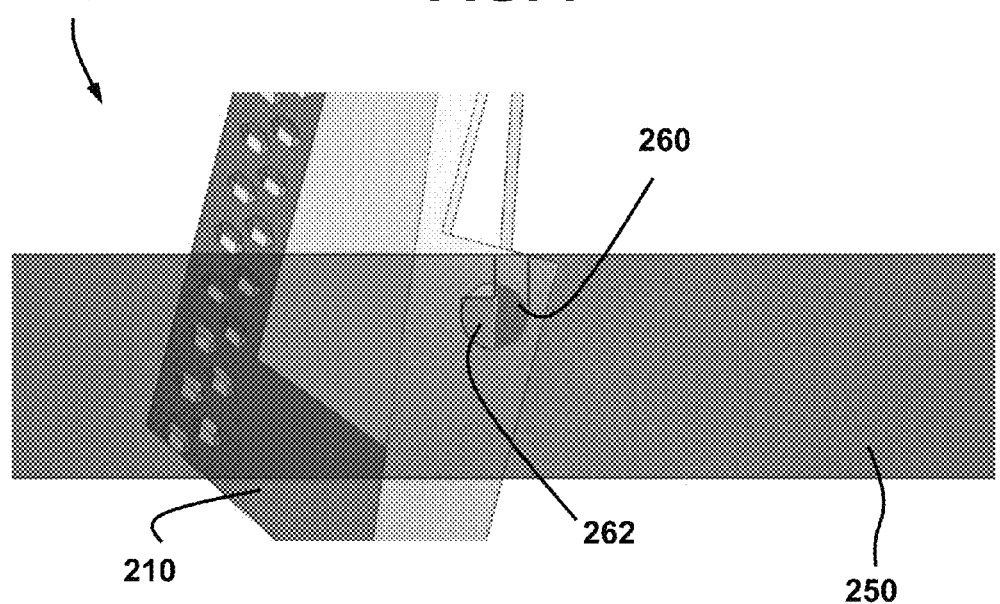
FIG. 8 is a view similar to FIG. 7, showing the cover before it is pulled up to be removed.
Figure 9:
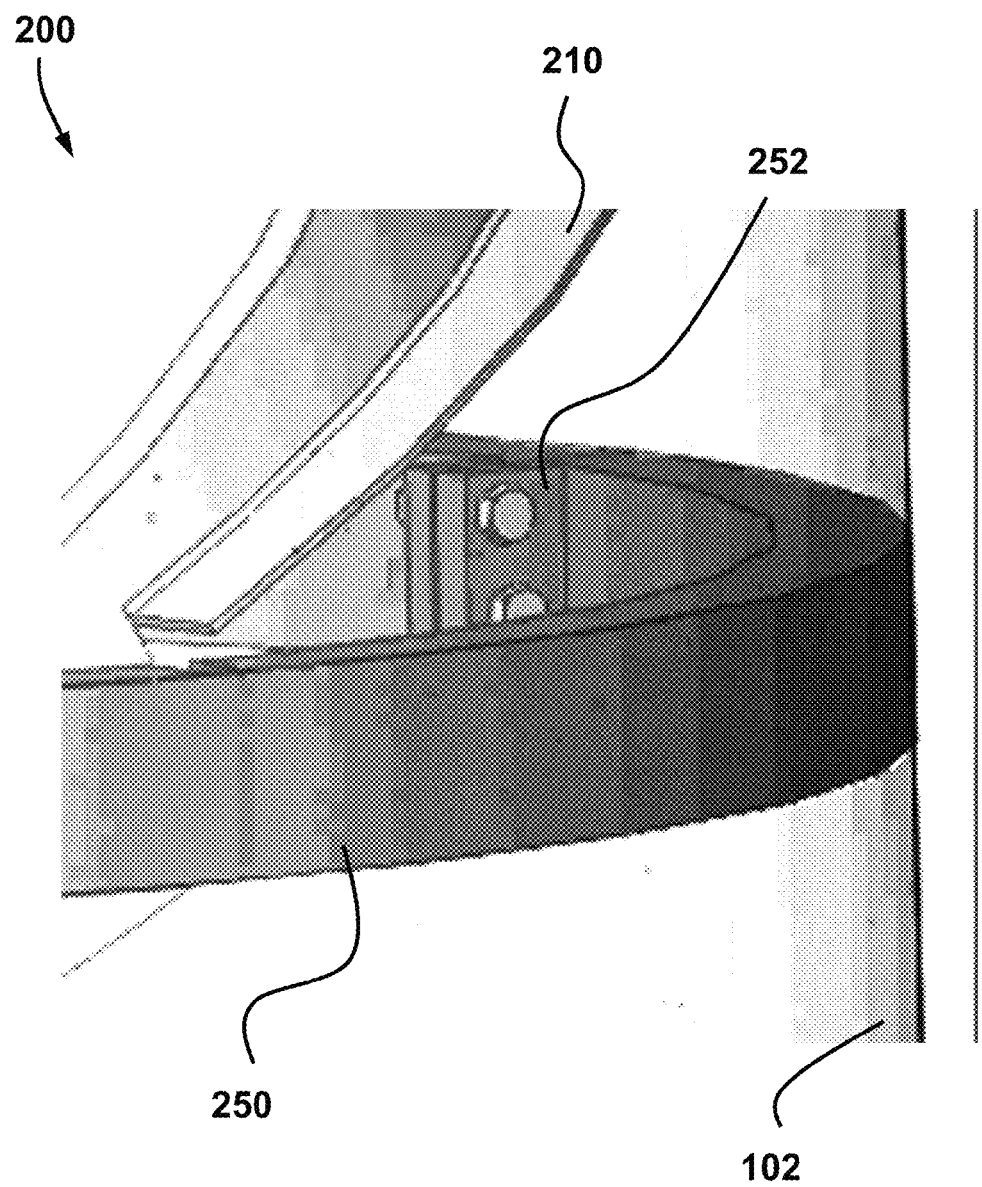
FIG. 9 is an enlarged isometric view of the expander device of the adapter.

FIG. 7 is an enlarged side view of the system 200 and FIG. 8 is a view similar to FIG. 7 showing the cover 210 before it is pulled up for removal. In this example, the lugs 260 have a semi-cylindrical shape which requires the cover 210 to be at an almost vertical angle in order to remove it from the adapter 250. Other types and configurations of devices to connect the cover 210 are possible. Thus, the cover 210 will not have a tendency to become unhinged while it is in use. A handle 270 may be provided on the top of the cover 210 to make it easier for a worker to install or to remove. For regions in which the cold season is accompanied by extremely low temperatures or build-ups of snow on the ground, it may prove necessary to remove the cover 210 for a certain period of time until there is a return to warmer temperatures so as to prevent the content of the reservoir 240 from freezing and/or prevent the cover 210 from freezing in its closed position. Temporary removal of the covers 210 is, however, compensated for by the fact that the emanations are generally less significant in cold weather than in hot weather. The adapter 250 may remain in place in most installations.

The air filter 230 may be made of various materials. It is preferably made of a material selected from the group consisting of woven, felt, synthetic foam or wood chips. Other materials are also possible.

Various types and compositions of liquids used for moistening the air filter 230 may be used as required and according to the nature of the gases emitted. The liquid may preferably be chosen from the group consisting of mixtures of essential oils and of competing bacteria. The essential oils are preferably those which have a good odor neutralizing capability. It may preferably be between 5 and 15%, preferably around 10%, of competing bacteria, between 5 and 15%, preferably around 10%, of essential oils, between 5 and 15%, preferably around 10%, of glycol, between 5 and 15%, preferably around 10%, of isopropyl alcohol, and between 20 and 80%, preferably around 60%, of activator, preferably an aqueous solution.

The competing bacteria are preferably chosen from the group of bacteria commonly used in biofilters, such as aerobic and/or anaerobic bacteria from the bacillus family. The liquid has a viscosity close to that of the essential oils.

The liquid may also include an agent for preventing insect larva, notably mosquito larva, from hatching out in the air filter 230. In addition, it should be noted that the system 200 makes it possible to prevent insects from finding it easy to lay their eggs in the stagnant water that there might be at the bottom of the access shaft 100.

The liquid may for example be the ODOCONTROL® PPC liquid marketed by the company Bioservice.ca. Emanations from the drain therefore pass through the impregnated air filter 230 and foul-smelling odors are greatly attenuated as the gases leave via the orifices 224 towards the top of the access shaft 100.

When it rains or when liquid overspills onto the upper part of the access shaft 100 and because of the unstable structure of the cover 210 with respect to the rotation axis, the cover 210, which was in the closed position, will gradually tip to create a passage that allows the liquids to flow toward the bottom of the access shaft 100. The tipping is blocked at a predetermined extreme position by limit stops present at the ends of the rotation axis 218 and configured to complement the cavities of the adapter 250. Immediately the pressure generated by the weight of the water on the cover 210 decreases, the cover can return to its initial position.

For greater effectiveness, the descending side of the cover 210 is the one situated nearest the curbside 114, because rainwater has a tendency to run along this edge in order to reach the access shaft 100.

The illustrated system 200 is able to filter over 95% of the air that comes out of the grating 112. It can be operated continuously or over a limited period of time. No loss of effectiveness is detectable in the event of drought or heavy rain. The system 200 allows almost complete filtration of the gases. The principle behind the diffusion of liquid by capillarity into the air filter 230 allows constant effectiveness and excellent neutralization of odors. Furthermore, tests carried out in the summer of 2011 using a panel revealed an 85% reduction in the odors emanating from storm drains.

The system 200 allows for easy replacement of the air filter 230. The replacement and/or refilling with active liquid and/or maintenance of the system 200 could also be performed easily at any time and in a single intervention.

Figure 10:
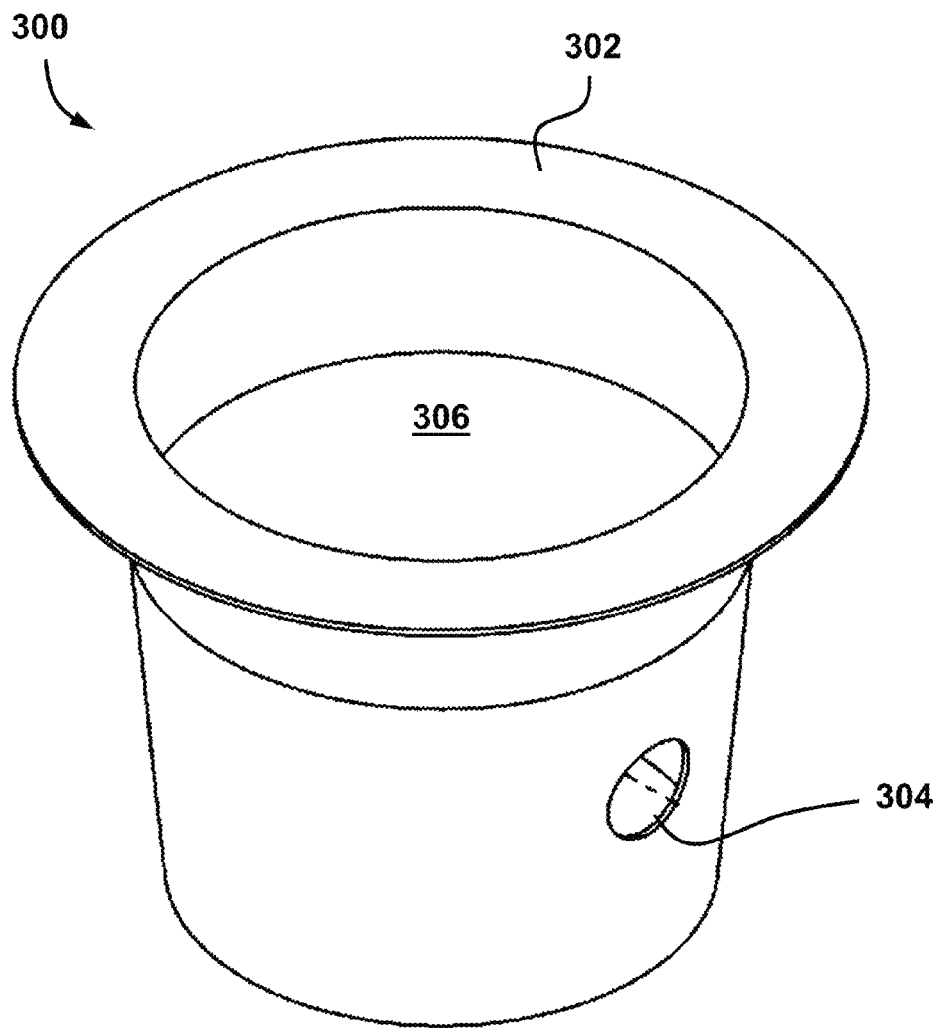
FIG. 10 is an isometric view of an example of a container that restricts the ingress of water and can be used in addition with the system.

FIG. 10 is an isometric view of an example of a container 300 that restricts the ingress of water toward the bottom 106 of the access shaft 100 and can be used in addition with the system 200. The container 300 can thus be suspended in the access shaft 100 directly under the cover 210, for example using the adapter 250 to support, by gravity, the upper rim 302 of the container 300. The container 300 includes a hole 304 in the side. The hole 304 could also be situated in the bottom. The diameter of the hole 304 represents approximately 50% of the diameter of the discharge pipe situated in the bottom 106 of the access shaft 100. For example, if the discharge pipe in the bottom of the access shaft 100 has a diameter of 8 inches (20.3 cm), the hole 304 will generally have a diameter of 4 inches (10.2 cm). The container 300 can be configured with a single hole 304 or with several holes. The holes 304 may be of different shapes and are not necessarily always round.

The principle of operation of the container 300 is as follows: in a spate, for example following a violent storm that has delivered large quantities of rainwater to the region in which the access shaft 100 is situated, a large quantity of water will seek to enter the access shaft 100 from above. If the water enters more quickly than the pipe in the bottom 106 can remove it, then the water will build up in the access shaft 100. If the container 300 is not installed, the water may rapidly reach a relatively significant depth between the bottom 106 and the surface of the water in the access shaft 100. The hydrostatic pressure head of this water column then carries the risk of causing the drain to overflow at certain points, notably in homes or other buildings in the vicinity. With the container 300, the amount of water that can reach the bottom 106 of the access shaft 100 will be limited. The water will therefore have a tendency to build up in the vessel 306 of the container 300 because the hole 304 will create a restriction. If the rainfall is very heavy, the water may even submerge the system 200. The system 200 may, however, undergo maintenance following this event. The main objective of the container 300 is to reduce the pressure in the sewage network in order notably to protect homes and buildings from overflowing sewers.

The present concept also includes a process for the manufacture of such a system as defined hereinabove and in which the constituent elements of the system 200 are assembled using known methods of assembly. These methods may for example be riveting, cutting, bonding, welding, screwing, molding. Others are also possible.

The present concept also includes a method for controlling at least one intrinsic characteristic of emanations, such as the foul-smelling, toxic and/or explosive nature of the emanations escaping from the access shaft 100, the method consisting in installing and activating the system 200 as defined hereinabove.

In addition, the present concept includes a method for controlling at least one intrinsic characteristic of emanations, such as the foul-smelling, toxic and/or explosive nature of the emanations escaping from the access shaft 100, the method including:
a) installing, within the access shaft 100, the system 200 that lessens the diffusion of foul-smelling, toxic and/or explosive emanations; and
b) filling the reservoir of the system 200 with liquid when necessary.

The present detailed description and the attached figures are merely examples. A person skilled in the art will recognize that variations can be made thereto without departing from the scope of the proposed concept.

What is claimed is:

1. A system for controlling and treating gas emanations within a wastewater access shaft, the access shaft having an internal wall, an upper edge and a bottom delimiting a substantially vertical chamber, which vertical chamber is divided transversely by the system into a lower section and an upper section, the system including:
   a cover having a main upper surface, the cover including:
      at least one pivoting part, which is normally closed, having a substantially horizontal rotation axis and allowing solid and/or liquid matter falling onto the main upper surface of the cover to pass toward the lower section of the vertical chamber;
      a raised part situated on the top of the cover and having at least one lateral wall including a plurality of orifices situated vertically above the main upper surface, the orifices defining an outlet of a gas-emanations circuit, which circuit is formed between the underside and the top of the cover;
   a device to connect the cover to the internal wall of the access shaft;
   an air filter arranged across the gas-emanations circuit formed in the cover; and
   a gas-emanations treatment liquid reservoir, the liquid reservoir being in fluid communication with the air filter in order to moisten air filter with the treatment liquid.

2. The system as defined in claim 1, in which the system includes:
   an adapter configured to fit which an interference engagement against the internal wall of the access shaft, the device to connect the cover being attached to the adapter.

3. The system as defined in claim 2, in which the internal wall of the access shaft is substantially circular, the adapter being substantially annular in shape and including an expander device to reduce or increase the outer diameter of the adapter.

4. The system as defined in claim 3, in which the adapter is made of a polymer material, preferably of plastic or of recycled rubber, with an internal metal reinforcement.

5. The system as defined in claim 1, in which the pivoting part of the cover tips under the weight of the solid and/or liquid matter falling onto the main upper surface of the cover.

6. The system as defined in claim 1, in which the pivoting part is the entire cover.

7. The system as defined in claim 6, in which:
   the device to connect the cover to the internal wall of the access shaft includes two oppose lugs that are coaxially disposed with reference to the rotation axis; and/or
   the cover is of a shape that is asymmetric with respect to the rotation axis, the raised part of the cover being at least predominantly situated on an ascending side of the cover and the main upper surface being predominantly situated on a descending side of the cover with respect to the rotation axis upon pivoting, the ascending side having a greater weight than the descending side so as to keep the cover normally in the closed position.

8. The system as defined in claim 7, in which the lugs each rest on a corresponding housing attached to the access shaft, the lugs and the housings having complementing shapes allowing the cover to be removed from the access shaft by manually pivoting the cover substantially vertically then by pulling the cover vertically.

9. The system as defined in claim 7, in which:
   the rotation axis is positioned substantially parallel to a curbside adjacent to the access shaft, the descending side of the cover being the one closest to the curbside; and/or
   the ascending side includes a ballast weight.

10. The system as defined in claim 1, in which:
    the liquid reservoir is situated in the cover, the cover preferably including a cap that allows the reservoir to be filled; and/or
    the liquid reservoir and the air filter are in fluid communication through capillarity.

11. The system as defined in claim 1, in which:
    the air filter is made of a material selected from the group consisting of a woven, a felt, synthetic foam or wood chips; and/or
    the liquid is chosen from the group consisting of mixtures of essential oils and competing bacteria.

12. The system as defined in claim 11, in which the liquid is a mixture consisting of:
    between 5 and 15%, preferably around 10%, of competing bacteria;
    between 5 and 15%, preferably around 10%, of essential oils;
    between 5 and 15%, preferably around 10%, of glycol;
    between 5 and 15%, preferably around 10%, of isopropyl alcohol; and
    between 20 and 80%, preferably around 60%, of activator, preferably an aqueous solution.

13. The system as defined in claim 12, in which the competing bacteria are preferably chosen from the group of bacteria commonly used in biofilters, such as aerobic and/or anaerobic bacteria from the bacillus family.

14. The system as defined in claim 11, in which the liquid includes the essential oils, which essential oils are providing an odor neutralizing capability.

15. The system as defined in claim 1, in which:
the liquid includes an agent for preventing insect larva, such as mosquito larva, from hatching out; and/or
the liquid has a viscosity similar to that of the essential oils.

16. The system as defined in claim 1, in which:
the air filter is held in place using a support attached to the device to connect the cover; and/or
the system also includes a perforated container restricting the ingress of water toward the bottom of the access shaft, which container is suspended in the access shaft directly under the cover.

17. The system as defined in claim 16, in which the perforated container includes at least one hole near the bottom of the container, the hole having a diameter that represents approximately 50% of the diameter of a discharge pipe situated in the bottom of the access shaft.

18. The system as defined in claim 1, in which:
the cover includes a handle situated on the top of the cover; and/or
the cover is situated at a depth that allow it to be accessed manually from the upper edge of the access shaft, the depth being preferably about 60 to 100 cm.

19. The system as defined in claim 1, in which the access shaft is an access shaft to a combined sewer and storm drain and the upper edge of which is closed by a grating.

20. A method for controlling at least one intrinsic characteristic of emanations, such as the foul-smelling, toxic and/or explosive nature of the emanations escaping from an access shaft, the method including:
a) installing, within the access shaft, the system as defined in claim 1 to lessen the diffusion of foul-smelling, toxic and/or explosive emanations; and
b) filling the reservoir of the system with liquid when necessary.

* * * * *